United States Patent
Cao et al.

(10) Patent No.: US 10,142,850 B2
(45) Date of Patent: Nov. 27, 2018

(54) METHOD AND DEVICE FOR USING UNLICENSED SPECTRUM

(71) Applicant: Huawei Technologies Co., Ltd., Shenzhen (CN)

(72) Inventors: Zhenzhen Cao, Beijing (CN); Qiang Li, Doha (QA)

(73) Assignee: Huawei Technologies Co., Ltd, Shenzhen (CN)

( * ) Notice: Subject to any disclaimer, the term of this patent is extended or adjusted under 35 U.S.C. 154(b) by 205 days.

(21) Appl. No.: 15/152,268

(22) Filed: May 11, 2016

(65) Prior Publication Data

US 2016/0255507 A1    Sep. 1, 2016

Related U.S. Application Data

(63) Continuation of application No. PCT/CN2013/086844, filed on Nov. 11, 2013.

(51) Int. Cl.
| | | |
|---|---|---|
| *H04W 16/10* | (2009.01) | |
| *H04W 74/02* | (2009.01) | |
| *H04W 72/04* | (2009.01) | |
| *H04W 72/00* | (2009.01) | |
| *H04W 28/06* | (2009.01) | |

(52) U.S. Cl.
CPC ....... *H04W 16/10* (2013.01); *H04W 72/0446* (2013.01); *H04W 74/02* (2013.01); *H04W 28/06* (2013.01); *H04W 72/00* (2013.01)

(58) Field of Classification Search
CPC . H04W 16/10; H04W 72/00; H04W 72/0446; H04W 74/02; H04W 28/06; H04W 16/00; H04W 16/02; H04W 16/04; H04W 16/06; H04W 16/14; H04W 74/04; H04W 74/002; H04W 74/006; H04W 28/08
See application file for complete search history.

(56) References Cited

U.S. PATENT DOCUMENTS

| | | | | |
|---|---|---|---|---|
| 6,212,173 B1 * | 4/2001 | Lindsay | ............... | G10L 19/012 370/331 |
| 8,423,041 B2 * | 4/2013 | Maekawa | ............... | A63F 13/12 455/448 |
| 9,106,421 B1 * | 8/2015 | Singh | .................... | H04L 9/0827 |

(Continued)

FOREIGN PATENT DOCUMENTS

| | | |
|---|---|---|
| CN | 1901398 A | 10/2007 |
| CN | 101778435 A | 7/2010 |

(Continued)

*Primary Examiner* — Kevin D Mew
(74) *Attorney, Agent, or Firm* — Slater Matsil, LLP (57) ABSTRACT

Embodiments provide a method and a device for using an unlicensed spectrum. In the method, a first access device receives first indication information sent by a second access device, where the first indication information is used to indicate idle time, in which the second access device does not perform data transmission, in a time segment that is reserved for the second access device to perform, by using an unlicensed spectrum, data transmission, and the first access device performs data transmission in the idle time by using the unlicensed spectrum. In a device provided, a first access device includes a receiving unit and a transmission unit.

16 Claims, 4 Drawing Sheets

An eNB2 performs data transmission by using an unlicensed spectrum, and sends first indication information to an eNB1 by using broadcasting or signaling, where the first indication information is used to indicate idle time, in which the eNB2 does not perform data transmission, in a time segment that is reserved for the eNB2 to use the unlicensed spectrum — S401

The eNB1 acquires the idle time from the first indication information, and performs, by using the unlicensed spectrum, data transmission in the idle time — S402

(56) References Cited

U.S. PATENT DOCUMENTS

| | | | |
|---|---|---|---|
| 2002/0163933 A1* | 11/2002 | Benveniste | H04L 47/10 370/465 |
| 2007/0248117 A1 | 10/2007 | Zuniga et al. | |
| 2010/0091716 A1* | 4/2010 | Bonta | H04W 4/20 370/329 |
| 2010/0284380 A1* | 11/2010 | Banerjee | H04W 16/14 370/338 |
| 2011/0028102 A1* | 2/2011 | Li | H04W 74/0816 455/71 |
| 2012/0077510 A1* | 3/2012 | Chen | H04W 28/26 455/452.1 |
| 2012/0207033 A1 | 8/2012 | Hakola et al. | |
| 2013/0155931 A1 | 6/2013 | Prajapati et al. | |
| 2014/0003387 A1* | 1/2014 | Lee | H04L 5/001 370/330 |
| 2014/0044105 A1* | 2/2014 | Bontu | H04L 5/001 370/336 |
| 2014/0120975 A1 | 5/2014 | Liu et al. | |
| 2014/0153415 A1* | 6/2014 | Choudhury | H04W 72/0446 370/252 |
| 2014/0286278 A1* | 9/2014 | Sohn | H04W 74/0816 370/329 |
| 2014/0355557 A1* | 12/2014 | Peng | H04W 16/14 370/330 |
| 2015/0092703 A1* | 4/2015 | Xu | H04L 5/003 370/329 |
| 2016/0142920 A1* | 5/2016 | Suzuki | H04W 16/14 370/336 |
| 2017/0142592 A1* | 5/2017 | Fischer | H04W 16/14 |
| 2017/0230975 A1* | 8/2017 | Tanaka | H04W 72/0446 |
| 2017/0295499 A1* | 10/2017 | Guo | H04W 16/14 |
| 2017/0332388 A1* | 11/2017 | Xu | H04W 72/12 |

FOREIGN PATENT DOCUMENTS

| | | |
|---|---|---|
| CN | 101815302 A | 8/2010 |
| CN | 102232307 A | 11/2011 |
| CN | 103281698 A | 9/2013 |
| JP | 2012169955 A | 9/2012 |
| KR | 20090008360 A | 1/2009 |
| WO | 2007127311 A2 | 11/2007 |
| WO | 2012040520 A1 | 3/2012 |
| WO | 2013078663 A1 | 6/2013 |

* cited by examiner

METHOD AND DEVICE FOR USING UNLICENSED SPECTRUM

This application is a continuation of International Application No. PCT/CN2013/086844, filed on Nov. 11, 2013, which is hereby incorporated by reference in its entirety.

TECHNICAL FIELD

Embodiments relate to the field of wireless communications, and in particular, to a method and a device for using an unlicensed spectrum.

BACKGROUND

As user services increase continuously, a licensed spectrum particularly allocated to an operator or a radio access technology for use gradually cannot meet a requirement for the increase of the user services. However, an unlicensed spectrum has relatively broad spectrum bandwidth, and may provide a service for the continuously increasing user services.

When an unlicensed spectrum is used, an access device sends a time segment used to indicate that the time segment is reserved for the access device to perform, by using the unlicensed spectrum, data transmission. After receiving the time segment sent by the access device, other access devices do not perform, by using the unlicensed spectrum, data transmission in the time segment of the unlicensed spectrum, so as to avoid interference generated by using the same unlicensed spectrum in the same time segment.

However, the foregoing technical solution fails to effectively use the unlicensed spectrum, thereby causing a waste of resources.

SUMMARY

In view of the foregoing technical problem, embodiments provide a method and a device for using an unlicensed spectrum.

According to a first aspect of the embodiments, a method for using an unlicensed spectrum is provided. The method includes receiving, by a first access device, first indication information sent by a second access device, where the first indication information is used to indicate idle time, in which the second access device does not perform data transmission, in a time segment that is reserved for the second access device to perform, by using an unlicensed spectrum, data transmission. The method also includes performing, by the first access device, data transmission in the idle time by using the unlicensed spectrum.

On the basis of the first aspect, in a first possible implementation manner of the first aspect, the idle time is a timeslot or a subframe, in which the second access device does not perform data transmission, in the time segment that is reserved for the second access device to perform, by using the unlicensed spectrum, data transmission.

On the basis of the first aspect or the first possible implementation manner of the first aspect, in a second possible implementation manner of the first aspect, before the receiving, by a first access device, first indication information sent by a second access device, the method further includes: receiving, by the first access device, second indication information sent by the second access device, where the second indication information is used to indicate the time segment that is reserved for the second access device to perform, by using the unlicensed spectrum, data transmission. The method also includes stopping, by the first access device, data transmission in the time segment that is reserved for the second access device to perform, by using the unlicensed spectrum, data transmission.

On the basis of any one of the first aspect to the second possible implementation manner of the first aspect, in a third possible implementation manner of the first aspect, the method further includes: receiving, by the first access device, third indication information sent by the second access device, where the third indication information is used to indicate a radio access technology used by the second access device; and the performing, by the first access device, data transmission in the idle time by using the unlicensed spectrum includes: performing, by the first access device by using the radio access technology, data transmission in the unlicensed spectrum and the idle time.

On the basis of the third possible implementation manner of the first aspect, in a fourth possible implementation manner of the first aspect, the performing, by the first access device by using the radio access technology in the unlicensed spectrum, data transmission in the idle time includes: determining, by the first access device, whether the first access device supports the radio access technology; and if yes, performing, by the first access device by using the radio access technology, data transmission in the unlicensed spectrum and the idle time.

On the basis of the third possible implementation manner or the fourth possible implementation manner of the first aspect, in a fifth possible implementation manner of the first aspect, the performing, by the first access device by using the radio access technology, data transmission in the unlicensed spectrum and the idle time includes: converting, by the first access device, the idle time into time corresponding to a radio access technology supported by the first access device; and performing, by the first access device by using the radio access technology, data transmission in the unlicensed spectrum and the time corresponding to the radio access technology supported by the first access device.

According to a second aspect of the embodiments, a first access device for using an unlicensed spectrum is provided. The device includes a receiving unit, configured to receive first indication information sent by a second access device, where the first indication information is used to indicate idle time, in which the second access device does not perform data transmission, in a time segment that is reserved for the second access device to perform, by using an unlicensed spectrum, data transmission. The device also includes a transmission unit, configured to perform, by using the unlicensed spectrum, data transmission in the idle time.

On the basis of the second aspect, in a first possible implementation manner of the second aspect, the idle time is a timeslot or a subframe, in which the second access device does not perform data transmission, in the time segment that is reserved for the second access device to perform, by using the unlicensed spectrum, data transmission.

On the basis of the second aspect or the first possible implementation manner of the second aspect, in a second possible implementation manner of the second aspect, before receiving the first indication information, the receiving unit is further configured to receive second indication information sent by the second access device, where the second indication information is used to indicate the time segment that is reserved for the second access device to perform, by using the unlicensed spectrum, data transmission; and the transmission unit is specifically configured to stop data transmission in the time segment that is reserved for the second access device to perform, by using the unlicensed spectrum, data transmission.

On the basis of any one of the second aspect to the second possible implementation manner of the second aspect, in a third possible implementation manner of the second aspect, the receiving unit is further configured to receive third indication information, where the third indication information is used to indicate a radio access technology used by the second access device; and the transmission unit is specifically configured to perform, by using the radio access technology, data transmission in the unlicensed spectrum and the idle time.

On the basis of the third possible implementation manner of the second aspect, in a fourth possible implementation manner of the second aspect, the transmission unit includes: a determining subunit, configured to determine whether the first access device supports the radio access technology; and an execution subunit, configured to perform, by using the radio access technology, data transmission in the unlicensed spectrum and the idle time when the determining subunit determines that the first access device supports the radio access technology.

On the basis the third possible implementation manner of the second aspect, in a fifth possible implementation manner of the second aspect, the transmission unit being specifically configured to perform, by using the radio access technology, data transmission in the unlicensed spectrum and the idle time includes: the transmission unit being specifically configured to convert the idle time into time corresponding to a radio access technology supported by the first access device, and perform, by using the radio access technology, data transmission in the unlicensed spectrum and the time corresponding to the radio access technology supported by the first access device.

According to a third aspect of the embodiments, a method for using an unlicensed spectrum is provided, including: acquiring, by a second access device, idle time, in which the second access device does not perform data transmission, in a time segment that is reserved for the second access device to perform, by using an unlicensed spectrum, data transmission. The method also includes sending, by the second access device, the idle time to a first access device, where the idle time is used to indicate a time segment in which the first access device performs data transmission by using the unlicensed spectrum.

On the basis of the third aspect, in a first possible implementation manner of the third aspect, the idle time is a timeslot or a subframe, in which the second access device does not perform data transmission, in the time segment that is reserved for the second access device to perform, by using the unlicensed spectrum, data transmission.

On the basis of the third aspect or the first possible implementation manner of the third aspect, in a second possible implementation manner of the third aspect, the method further includes: sending, by the second access device, second indication information to the first access device, where the second indication information is used to indicate the time segment that is reserved for the second access device to perform, by using the unlicensed spectrum, data transmission.

On the basis of the third aspect to the second possible implementation manner of the third aspect, in a third possible implementation manner of the third aspect, the method further includes: sending, by the second access device, third indication information to the first access device, where the third indication information is used to indicate a radio access technology used by the second access device, so that the first access device performs, by using the radio access technology, data transmission in the unlicensed spectrum and the idle time.

According to a fourth aspect of the embodiments, a second access device is provided. The device includes an acquisition unit, configured to acquire idle time, in which the second access device does not perform data transmission, in a time segment that is reserved for the second access device to perform, by using an unlicensed spectrum, data transmission. The device also includes a sending unit, configured to send the idle time to a first access device, where the idle time is used to indicate a time segment in which the first access device performs data transmission by using the unlicensed spectrum.

On the basis of the fourth aspect, in a first possible implementation manner of the fourth aspect, the idle time is a timeslot or a subframe, in which the second access device does not perform data transmission, in the time segment that is reserved for the second access device to perform, by using the unlicensed spectrum, data transmission.

On the basis of the fourth aspect or the first possible implementation manner of the fourth aspect, in a second possible implementation manner of the fourth aspect, the sending unit is further configured to send second indication information to the first access device, where the second indication information is used to indicate the time segment that is reserved for the second access device to perform, by using the unlicensed spectrum, data transmission.

On the basis of any one of the fourth aspect to the second possible implementation manner of the fourth aspect, in a third possible implementation manner of the fourth aspect, the sending unit is further configured to send third indication information to the first access device, where the third indication information is used to indicate a radio access technology used by the second access device, so that the first access device performs, by using the radio access technology, data transmission in the unlicensed spectrum and the idle time.

By means of application of the technical solutions provided in the embodiments of the present invention, in a same unlicensed spectrum, and in the idle time, in which data transmission is not performed, in the time segment that is reserved for the second access device to perform data transmission, the first access device performs data transmission by using the unlicensed spectrum, so that the unlicensed spectrum in the idle time can be fully utilized and a waste of resources is reduced.

BRIEF DESCRIPTION OF THE DRAWINGS

For a more complete understanding of the present invention, and the advantages thereof, reference is now made to the following descriptions taken in conjunction with the accompanying drawings, in which.

To describe the technical solutions in the embodiments of the present invention or in the prior art more clearly, the following briefly describes the accompanying drawings required for describing the embodiments. Apparently, the accompanying drawings in the following description show some embodiments of the present invention, and a person of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention clearer, the following clearly and describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

The technical solutions provided in the embodiments may be applied to various communications systems of radio access technologies. For example, the radio access technologies include, but are not limited to, a global system for mobile communications (GSM), a general packet radio service (GPRS) system, a code division multiple access (CDMA) system, a CDMA2000 system, a wideband code division multiple access (WCDMA) system, a long term evolution (LTE) system, a world interoperability for microwave access (WiMAX) system, and a wireless local network (WLAN).

A first access device or a second access device in the embodiments of the present invention may be a network element such as a base transceiver station (base transceiver station, BTS) in the GSM system, the GPRS system, or the CDMA system, a NodeB in the WCDMA system, an evolved node B (eNB, or eNodeB) in the LTE system, an access service network base station (ASN BS) in the WiMAX network, or a WLAN access point (AP) in the WLAN.

Figure 1:
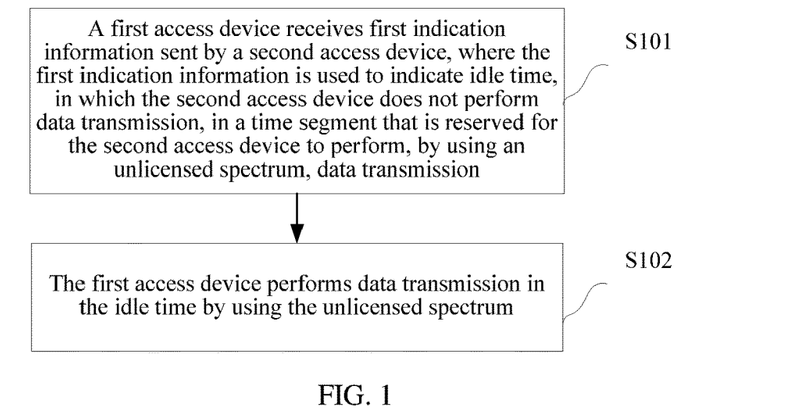
FIG. 1 is a schematic flowchart of a method for using an unlicensed spectrum according to an aspect of an embodiment.

FIG. 1 is a schematic flowchart of a method for using an unlicensed spectrum according to an aspect of an embodiment. As shown in FIG. 1, the method includes the following content.

S101: A first access device receives, first indication information sent by a second access device, where the first indication information is used to indicate idle time, in which the second access device does not perform data transmission, in a time segment that is reserved for the second access device to perform, by using an unlicensed spectrum, data transmission (briefly referred to as a reserved time segment below).

When performing data transmission by using the unlicensed spectrum, the second access device may determine the idle time, in which the second access device essentially does not perform data transmission, in the reserved time segment. The idle time may be a timeslot or a subframe, in which the second access device essentially does not perform data transmission, in the reserved time segment. The reserved time segment may be reserved by a management device (for example, a centralized control node or a network management system) of the second access device and is sent, by using signaling or broadcasting, to the first access device, or may be obtained by the second access device by means of calculation and is sent, by using signaling or broadcasting, to the first access device. The reserved time segment may be a continuous period of time, or may be a combination of multiple periodic time segments or a combination of multiple aperiodic time segments. Accordingly, the idle time may be a continuous period of time, or may be a combination of multiple periodic or aperiodic time segments.

As an example, the reserved time segment may be determined according to the following manner: the second access device receives a buffer status report (BSR) sent by user equipment, where the BSR includes volume of data to be transmitted by the user equipment. The second access device determines a data transmission rate of the user equipment when an unlicensed spectrum is used. For example, the second access device calculates, by using a least square method, a current data transmission rate of the user equipment according to data transmission rates of historical transmission of the user equipment. The second access device divides the volume of data to be transmitted by the user equipment by the calculated data transmission rate of the user equipment to obtain the reserved time segment.

As an example, after the reserved time segment is calculated, the idle time may be determined according to the following manner: the second access device selects a modulation and coding scheme (MCS) for the user equipment according to channel quality, and calculates transmission time for data transmission between the second access device and the user equipment. The idle time is obtained by subtracting the transmission time from the reserved time segment.

As another example, in a case in which only uplink data transmission is taken into consideration, the idle time may be determined according to the following manner: in a case of one uplink data transmission, the second access device records a time point at which signaling, used to schedule user equipment to send uplink data, is sent to the user equipment, and a time point at which the uplink data sent by the user equipment is received, and a difference between the two time points is the idle time in the one uplink data transmission. In a case of multiple times of uplink data transmission, the idle time in the reserved time segment is a sum of idle time in the multiple times of uplink data transmission.

The second access device may send the first indication information to the first access device in a broadcasting manner. The second access device may send the first indication information to the first access device in a manner of adding the first indication information to existing signaling.

The first indication information may have multiple implementation forms.

As an example, the first indication information may indicate that the idle time is a continuous period of time formed by a starting time point and duration. The idle time may be in the unit of timeslots or in the unit of subframes. For example, the starting time point may represent starting from a subframe of a specific sequence number, and the duration may represent lasting for a specific quantity of subframes. When {the starting time point is 1, and the duration is 4}, it represents that a period of time starting from a next subframe of a subframe in which the first indication information is delivered, and lasting for 4 subframes is the idle time. When the idle time is in the unit of timeslots (one or more timeslots may constitute one subframe), the starting time point may represent starting from a timeslot of a specific sequence number, and the duration may represent lasting for a specific quantity of timeslots. When {the starting time point is 1, and the duration is 4}, it represents that a period of time starting from a next timeslot of a timeslot in which the first indication information is delivered, and lasting for 4 timeslots is the idle time. Alternatively, when {the starting time point is 1, and the duration is infinite}, it may represent that a period of time starting from a next timeslot of a timeslot in which the first indication information is delivered, and lasting until the reserved time segment ends is the idle time. It should be understood that different settings may be performed according to the idea of the present invention.

As another example, the first indication information may indicate that periodic time formed by a starting time point and a period is the idle time. The idle time may be in the unit of timeslots or in the unit of subframes. For example, when {the starting time point is 1, and the period is 5}, it may represent that every 5 timeslots or subframes starting from a next timeslot or subframe of a timeslot in which the first indication information is delivered may be used as the idle time in the reserved time segment. In this case, a set formed by sequence numbers of the timeslots or subframes that are included in the idle time is in an arithmetic progression according to a chronological order.

Optionally, currently, an unlicensed spectrum is mainly used by a device that uses a wireless fidelity (WiFi) technology, and therefore, to enable the first access device and the second access device to support the WiFi technology, WiFi modules may be installed in the first access device and the second access device, so that the first access device and the second access device support the WiFi technology. In this case, the first indication information sent by the second access device may be carried in a WiFi frame, such as a clear-to-send (CTS) frame, a request-to-send (RTS) frame, a beacon frame, an acknowledgement frame, or a service data frame. The CTS frame, the RTS frame, the beacon frame, and the acknowledgement frame are signaling frames, and the service data frame is a data frame.

S102: The first access device performs data transmission in the idle time by using the unlicensed spectrum.

After receiving the first indication information, the first access device may acquire the reserved time segment indicated by the first indication information. In the reserved time segment, the second access device does not perform, by using the unlicensed spectrum, data transmission in the idle time, and therefore, the first access device may perform, by using the unlicensed spectrum, data transmission by using the idle time, so as to improve resource utilization.

In the embodiments, data transmission includes service data transmission or signaling data transmission.

Optionally, before the first access device receives the first indication information sent by the second access device, the method further includes: steps S099 and S100.

S099: The first access device receives second indication information sent by the second access device, where the second indication information is used to indicate the reserved time segment.

The second access device may send the second indication information to the first access device in a broadcasting manner. The second access device may send the second indication information to the first access device in a manner of adding the second indication information to existing signaling.

Similar to the first indication information, when the first access device and the second access device support the WiFi technology, the second indication information may be carried in a WiFi frame, such as a CTS frame, an RTS frame, a beacon frame, an acknowledgement frame, or a service data frame. The second indication information and the first indication information may be carried in a same WiFi frame to be sent, or be carried in different WiFi frames to be sent separately.

S100: The first access device stops data transmission in the unlicensed spectrum and the reserved time segment.

In the reserved time segment, the first access device may stop performing, by using the unlicensed spectrum, data transmission in the reserved time segment, so as to avoid mutual interference caused by simultaneous use of the unlicensed spectrum by the first access device and the second access device. After the first access device receives the second indication information and stops performing, by using the unlicensed spectrum, data transmission in the reserved time segment, if the first access device receives the first indication information, to improve resource utilization, the first access device may still perform, by using the unlicensed spectrum, data transmission in the idle time in the reserved time segment that is indicated by the first indication information.

On the basis of the foregoing various implementation manners, the first access device may further receive third indication information sent by the second access device, where the third indication information is used to indicate a radio access technology used by the second access device. Accordingly, in the unlicensed spectrum, the performing, by the first access device, data transmission in the idle time by using the unlicensed spectrum includes: performing, by the first access device by using the radio access technology, data transmission in the idle time. The third indication information and the first indication information may be carried in a same message or frame.

Optionally, the performing, by the first access device by using the radio access technology, data transmission in the idle time includes: determining, by the first access device, whether the first access device supports the radio access technology, and if yes, performing, by the first access device by using the radio access technology, data transmission in the idle time.

Optionally, if the first access device does not support the radio access technology, the first access device may perform data transmission in the idle time by using a radio access technology different from the radio access technology.

In specific implementations, time lengths of timeslots or subframes in various radio access technologies may be different. Therefore, after the first access device receives the idle time indicated by the second access device, if the first access device does not use a radio access technology the same as that of the second access device, the first access device may need to convert the idle time indicated by the second access device into idle time corresponding to the radio access technology used by the first access device. For example, for the LTE system, the time length of one subframe is 1 ms, one subframe includes two timeslots, and the time length of one timeslot is 0.5 ms; for the WCDMA system, the time length of one subframe is 2 ms, one subframe includes 3 timeslots, and the time length of one timeslot is 0.666 ms. It is assumed that a radio access technology used by the second access device is WCDMA, and the idle time sent by the second access device to the first access device is the 10th subframe. If a radio access technology used by the first access device when using the unlicensed spectrum is also WCDMA, the first access device performs data transmission in the 10th subframe. If the radio access technology used by the first access device when using the unlicensed spectrum is LTE, and it is assumed that the time of the first access device is synchronous with that of the second access device and timing starts from the 1st subframe, the 10th subframe of WCDMA is 19 ms to 20 ms, which corresponds to the 19th subframe and the 20th subframe of LTE (corresponding to the 37th timeslot, the 38th timeslot, the 39th timeslot, and the 40th timeslot). Therefore, the first access device performs data transmission in the unlicensed spectrum and the 19th subframe or 20th subframe by using LTE as the radio access technology, so as to effectively use the idle time of the second access device.

The first access device may perform data transmission in the idle time by using a radio access technology different from that of the second access device. Further, to avoid interference that may be generated by use of different radio access technologies by the first access device and the second access device, the first access device may perform, by preferably using a radio access technology the same as that of the second access device, data transmission in the idle time in the reserved time segment.

By means of the third indication information, the first access device may learn the radio access technology used, when using the unlicensed spectrum, by the second access device. The first access device may perform, by using a radio access technology the same as the radio access technology used by the second access device when using the unlicensed spectrum, data transmission in the idle time, so as to avoid interference generated by use of different radio access technologies by the first access device and the second access device.

By means of application of the technical solution provided in this embodiment of the present invention, in a same unlicensed spectrum, and in the idle time, in which data transmission is not performed, in the time segment that is reserved for the second access device to perform data transmission, the first access device performs data transmission by using the unlicensed spectrum, so that the unlicensed spectrum in the idle time can be fully utilized and a waste of resources is reduced.

Figure 2:
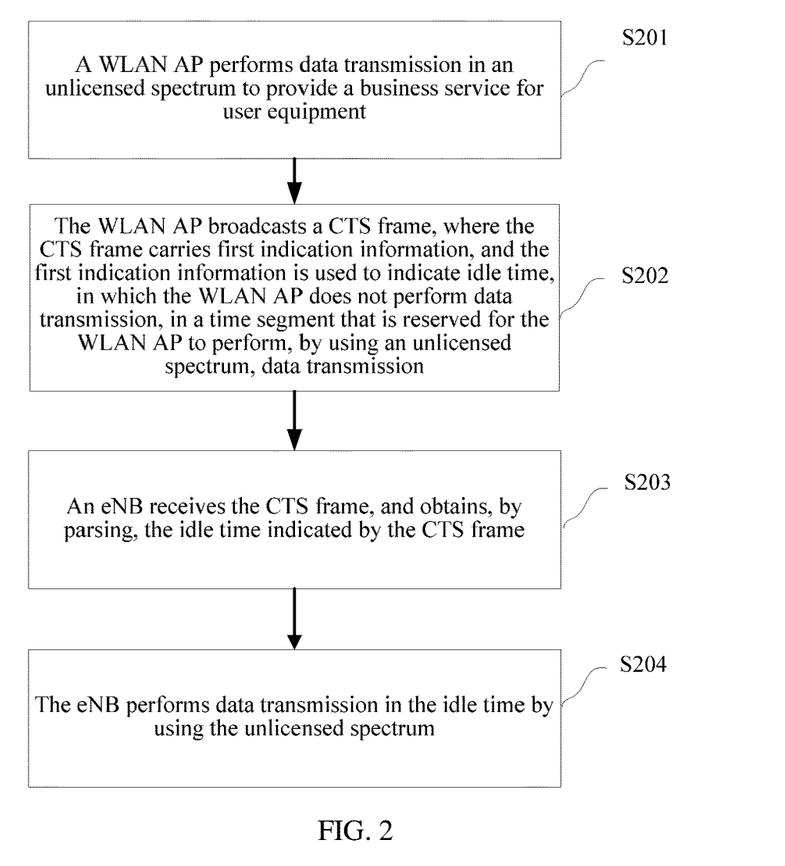
FIG. 2 is a schematic flowchart of a method for using an unlicensed spectrum according to another aspect of an embodiment.

FIG. 2 is a schematic flowchart of a method for using an unlicensed spectrum according to another aspect of an embodiment. The method embodiment shown in FIG. 2 further provides a detailed description of the method embodiment shown in FIG. 1. The first access device is a WLAN AP that uses a WiFi technology, the second access device is an eNB in an LTE system, and the eNB supports the use of the WiFi technology. The WLAN AP may be managed by the eNB in a heterogeneous network, or the WLAN AP may be not managed by the eNB. The method includes the following content.

S201: The WLAN AP performs data transmission in an unlicensed spectrum to provide a business service for user equipment.

S202: The WLAN AP broadcasts a CTS frame, where the CTS frame carries first indication information, and the first indication information is used to indicate idle time, in which the WLAN AP does not perform data transmission, in a time segment that is reserved for the WLAN AP to perform, by using an unlicensed spectrum, data transmission.

S203: The eNB receives the CTS frame, and obtains, by parsing, the idle time indicated by the CTS frame.

S204: The eNB performs data transmission in the idle time by using the unlicensed spectrum.

In S204, the eNB may perform data transmission in the idle time by directly using the WiFi technology, or the eNB may convert the idle time into a corresponding timeslot or subframe in the LTE system and perform, by using an LTE technology, data transmission in the idle time obtained after conversion. For example, it is assumed that the time of the WLAN AP is synchronous with that of the eNB, and timing starts from the 1st millisecond. It is assumed that the idle time indicated by the WLAN AP is from the 5th millisecond to the 8th millisecond. Therefore, the eNB may perform, by directly using the WiFi technology and the unlicensed spectrum, data transmission in the 5th millisecond to the 8th millisecond. Alternatively, 1 millisecond is the length of one subframe or the length of two timeslots in the LTE system, and therefore, the eNB may perform, by using the LTE technology and the unlicensed spectrum, data transmission in the 5th subframe to the 8th subframe (corresponding to the 9th timeslot to the 16th timeslot).

In this embodiment, the CTS frame may be replaced with another WiFi frame, such as an RTS frame, a beacon frame, an acknowledgement frame, or a service data frame.

By means of application of the technical solution provided in this embodiment of the present invention, in a same unlicensed spectrum, and in the idle time, in which data transmission is not performed, in the time segment that is reserved for the WLAN AP to perform data transmission, the eNB performs data transmission by using the unlicensed spectrum, so that the unlicensed spectrum in the idle time can be fully utilized and a waste of resources is reduced.

Figure 3:
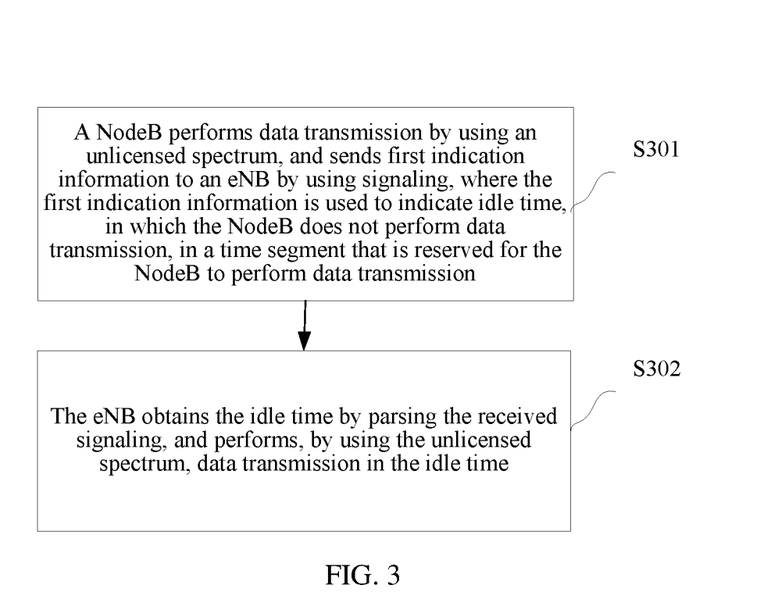
FIG. 3 is a schematic flowchart of a method for using an unlicensed spectrum according to another aspect of an embodiment.

FIG. 3 is a schematic flowchart of a method for using an unlicensed spectrum according to another aspect of an embodiment of the present invention. The method embodiment shown in FIG. 3 further provides a detailed description of the method embodiment shown in FIG. 1. The first access device is an eNB in an LTE system, and the second access device is a NodeB in a WCDMA system. The method embodiment shown in FIG. 3 includes the following content.

S301: A NodeB performs data transmission by using an unlicensed spectrum, and sends first indication information to an eNB by using signaling, where the first indication information is used to indicate idle time, in which the NodeB does not perform data transmission, in a time segment that is reserved for the NodeB to perform data transmission.

S302: The eNB obtains the idle time by parsing the received signaling, and performs, by using the unlicensed spectrum, data transmission in the idle time.

Optionally, the NodeB may send third indication information to the eNB by using signaling, where the third indication information is used to indicate that a radio access technology used by the NodeB is WCDMA. Therefore, if the eNB supports the WCDMA technology, after receiving the idle time, the eNB may perform, by using the WCDMA technology, data transmission in a timeslot or a subframe indicated by the idle time. If the eNB does not support the WCDMA technology, the eNB may convert the idle time sent by the NodeB into an idle timeslot or an idle subframe corresponding to an LTE technology, and perform data transmission in the idle timeslot or idle subframe corresponding to the LTE technology.

By means of application of the technical solution provided in this embodiment of the present invention, in a same unlicensed spectrum, and in the idle time, in which data transmission is not performed, in the time segment that is reserved for the NodeB to perform data transmission, the eNB performs data transmission by using the unlicensed spectrum, so that the unlicensed spectrum in the idle time can be fully utilized and a waste of resources is reduced.

Figure 4:
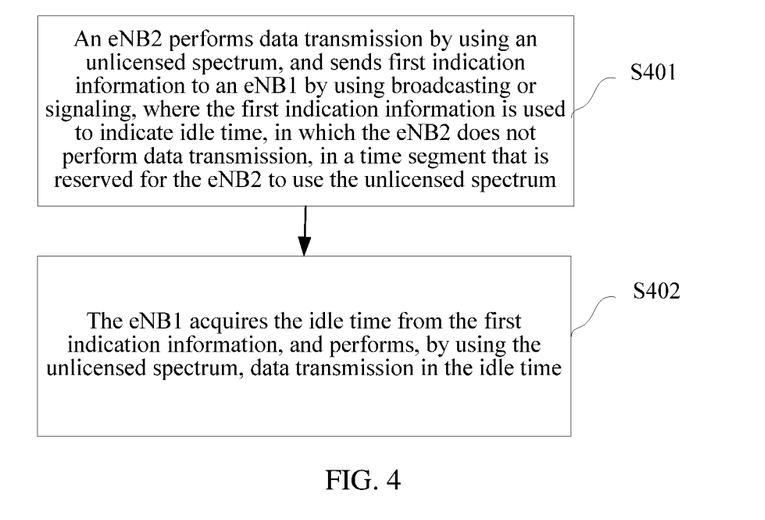
FIG. 4 is a schematic flowchart of a method for using an unlicensed spectrum according to yet another aspect of an embodiment.

FIG. 4 is a schematic flowchart of a method for using an unlicensed spectrum according to yet another aspect of an embodiment of the present invention. The method embodiment shown in FIG. 4 further provides a detailed description of the method embodiment shown in FIG. 1. The first access device is an eNB1 in an LTE system, and the second access device is an eNB2 in the LTE system. The method embodiment shown in FIG. 4 includes the following content.

S401: An eNB2 performs data transmission by using an unlicensed spectrum, and sends first indication information to an eNB1 by using broadcasting or signaling, where the first indication information is used to indicate idle time, in which the eNB2 does not perform data transmission, in a time segment that is reserved for the eNB2 to use the unlicensed spectrum.

S402: The eNB1 acquires the idle time from the first indication information, and performs, by using the unlicensed spectrum, data transmission in the idle time.

Optionally, the eNB2 may further send third indication information to the eNB1, where the third indication information is used to indicate that a radio access technology used by the eNB2 is LTE. Therefore, the eNB1 performs, by using the LTE technology, data transmission in the idle time.

By means of application of the technical solution provided in this embodiment of the present invention, in a same unlicensed spectrum, and in the idle time, in which data transmission is not performed, in the time segment that is reserved for the eNB2 to perform data transmission, the eNB1 performs data transmission by using the unlicensed spectrum, so that the unlicensed spectrum in the idle time can be fully utilized and a waste of resources is reduced.

In the foregoing embodiments, on the basis of different radio access technologies, data transmission performed by using the different radio access technologies may be not the same. For example, for use of a WiFi technology, carrier sense multiple access with collision detection (CSMA/CD) in an IEEE 802.11 protocol may be used to perform data transmission. With regard to an LTE system, an orthogonal frequency division multiplexing (OFDM) technology is used to perform data transmission, and the like. For details of data transmission methods in various radio access technologies, reference may be made to the prior art.

Figure 5:
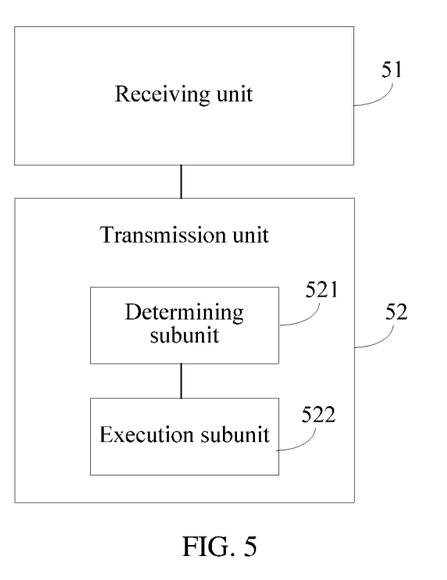
FIG. 5 is a schematic structural diagram of a first access device 50 according to an embodiment.

On the basis of the method embodiment shown in any one of FIG. 1 to FIG. 4, an embodiment of the present invention further provides a structural composition of a first access device using the method. With regard to descriptions the same as or similar to the descriptions in the method embodiments, details are not described in this embodiment again. FIG. 5 is a schematic structural diagram of a first access device 50 according to an embodiment of the present invention, and the first access device 50 includes a receiving unit 51 and a transmission unit 52.

The receiving unit 51 is configured to receive first indication information sent by a second access device, where the first indication information is used to indicate idle time, in which the second access device does not perform data transmission, in a time segment that is reserved for the second access device to perform, by using an unlicensed spectrum, data transmission (briefly referred to as a reserved time segment).

The transmission unit 52 is configured to perform, by using the unlicensed spectrum, data transmission in the idle time.

Optionally, the idle time may be a timeslot or a subframe, in which the second access device does not perform data transmission, in the reserved time segment.

Optionally, before receiving the first indication information, the receiving unit 51 is further configured to receive second indication information sent by the second access device, where the second indication information is used to indicate the reserved time segment; and the transmission unit 52 is specifically configured to stop data transmission in the reserved time segment. If the receiving unit 51 receives the first indication information, the transmission unit 52 may perform, according to indication of the first indication information and by using the unlicensed spectrum, data transmission in the idle time, in which the second access device does not perform data transmission, in the reserved time segment.

Optionally, the receiving unit 51 is further configured to receive third indication information, where the third indication information is used to indicate a radio access technology used by the second access device; and the transmission unit 52 is specifically configured to perform, by using the radio access technology, data transmission in the unlicensed spectrum and the idle time. Optionally, the transmission unit 52 includes a determining subunit 521 and an execution subunit 522. The determining subunit 521 is configured to determine whether the first access device supports the radio access technology; and the execution subunit 522 is configured to perform, by using the radio access technology, data transmission in the unlicensed spectrum and the idle time when the determining subunit 521 determines that the first access device supports the radio access technology.

Units in this embodiment may be used as independent hardware entities, or may be integrated to form an independent hardware entity.

Figure 6:
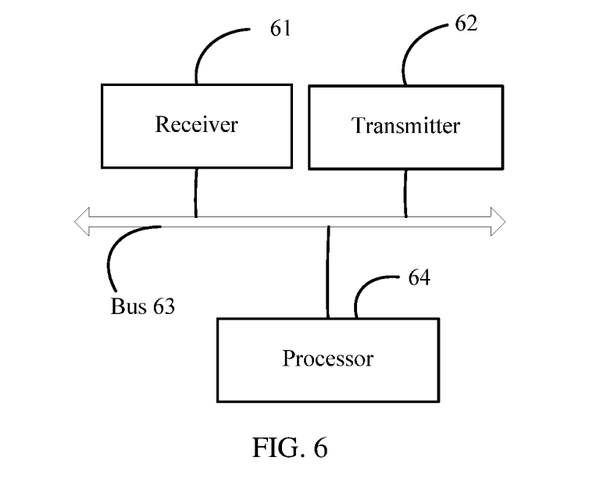
FIG. 6 is a schematic structural diagram of another first access device 60 according to an embodiment.

On the basis of the method embodiment shown in any one of FIG. 1 to FIG. 4, an embodiment of the present invention provides a structural composition of a first access device 60 using a method for using an unlicensed spectrum. With regard to descriptions the same as or similar to the descriptions in the method embodiments, details are not described in this embodiment again. FIG. 6 is a schematic structural diagram of another first access device 60 according to an embodiment of the present invention, and the first access device 60 includes a receiver 61 and a transmitter 62, where the receiver 61 and the transmitter 62 are connected by using a bus 63.

The receiver 61 is configured to receive first indication information sent by the second access device, where the first indication information is used to indicate idle time, in which the second access device does not perform data transmission, in the reserved time segment.

The receiver 61 and the transmitter 62 are configured to perform, by using the unlicensed spectrum, data transmission in the idle time.

Optionally, the idle time is a timeslot or a subframe, in which the second access device does not perform data transmission, in the reserved time segment.

Optionally, the receiver 61 is further configured to receive second indication information sent by the second access device, where the second indication information is used to indicate the reserved time segment. Further, the receiver 61 and the transmitter 62 are further configured to stop data transmission before receiving the first indication information. After the receiver 61 receives the first indication information sent by the second access device, the receiver 61 and the transmitter 62 may perform, by using the unlicensed spectrum, data transmission in the idle time according to indication of the first indication information.

Optionally, the receiver 61 is further configured to receive third indication information, where the third indication information is used to indicate a radio access technology used by the second access device; and accordingly, the receiver 61 and the transmitter 62 are specifically configured to perform, by using the radio access technology, data transmission in the unlicensed spectrum and the idle time. As an example, the first access device may further include a processor 64, where the processor 64 can determine whether the first access device supports the radio access technology used by the second access device and indicated by the third indication information, and if yes, the processor 64 controls the receiver 61 and the transmitter 62 to perform, by using the radio access technology, data transmission in the unlicensed spectrum and the idle time; and if not, the processor 64 may control the receiver 61 and the transmitter 62 to skip performing data transmission in the unlicensed spectrum and the idle time, or the processor 64 converts the idle time into time corresponding to a radio access technology supported by the first access device and controls the receiver 61 and the transmitter 62 to perform, by using the radio access technology supported by the first access device, data transmission in the time.

In this embodiment, the processor 64 may be various central processing units, field programmable gate arrays, signal processors, or the like. The receiver 61 and the transmitter 62 may be antennas, radio frequency processing units, or the like. A person skilled in the art may understand the foregoing specific hardware implementations, and details are not described in this embodiment again.

By means of application of the technical solution provided in the embodiment shown in FIG. 5 or FIG. 6, in a same unlicensed spectrum, and in the idle time, in which data transmission is not performed, in the time segment that is reserved for the second access device to perform data transmission, the first access device performs data transmission by using the unlicensed spectrum, so that the unlicensed spectrum in the idle time can be fully utilized and a waste of resources is reduced.

Figure 7:
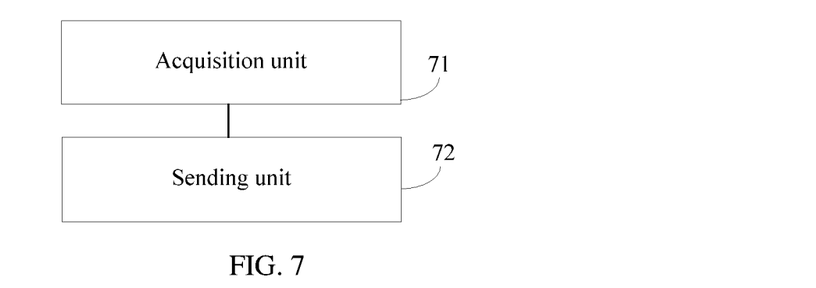
FIG. 7 is a schematic structural diagram of a second access device 70 according to an embodiment.

On the basis of the method embodiment shown in any one of FIG. 1 to FIG. 4, an embodiment of the present invention provides a structural composition of a second access device 70. With regard to descriptions the same as or similar to the descriptions in the method embodiments, details are not described in this embodiment again. FIG. 7 is a schematic structural diagram of a second access device 70 according to an embodiment of the present invention, and the second access device 70 includes: an acquisition unit 71, configured to acquire idle time, in which the second access device does not perform data transmission, in a time segment that is reserved for the second access device to perform, by using an unlicensed spectrum, data transmission; and a sending unit 72, configured to send the idle time to a first access device, where the idle time is used to indicate a time segment in which the first access device performs data transmission by using the unlicensed spectrum.

For a method used by the acquisition unit 71 to acquire the time segment that is reserved for the second access device to perform, by using the unlicensed spectrum, data transmission, and the idle time, reference may be made to the method embodiments.

Optionally, the idle time is a timeslot or a subframe, in which the second access device does not perform data transmission, in the time segment that is reserved for the second access device to perform, by using the unlicensed spectrum, data transmission.

Optionally, the sending unit 72 is further configured to send second indication information to the first access device, where the second indication information is used to indicate the time segment that is reserved for the second access device to perform, by using the unlicensed spectrum, data transmission.

On the basis of the foregoing implementation manner, the sending unit 72 is further configured to send third indication information to the first access device, where the third indication information is used to indicate a radio access technology used by the second access device, so that the first access device performs, by using the radio access technology, data transmission in the unlicensed spectrum and the idle time.

Figure 8:
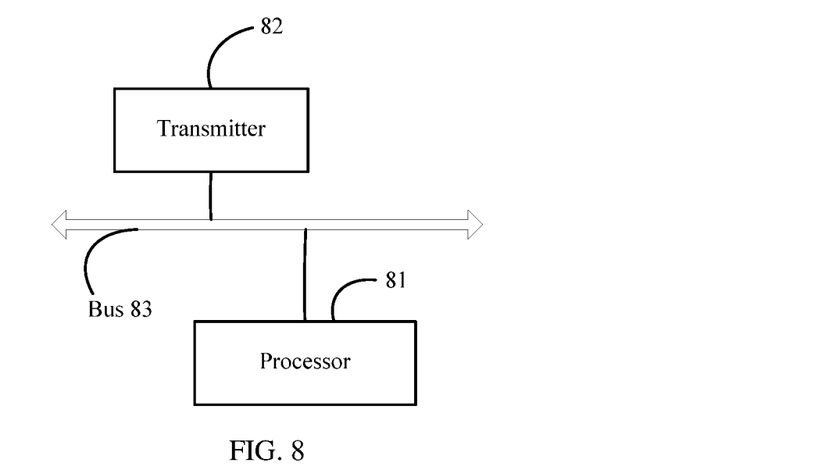
FIG. 8 is a schematic structural diagram of another second access device 80 according to an embodiment.

On the basis of the method embodiment shown in any one of FIG. 1 to FIG. 4, an embodiment of the present invention provides a structural composition of another second access device 80. With regard to descriptions the same as or similar to the descriptions in the method embodiments, details are not described in this embodiment again. FIG. 8 is a schematic structural diagram of another second access device 80 according to an embodiment of the present invention, and the second access device 80 includes a processor 81 and a transmitter 82, where the processor 81 and the transmitter 82 are connected by using a bus 83.

The processor 81 is configured to acquire idle time, in which the second access device does not perform data transmission, in a time segment that is reserved for the second access device to perform, by using an unlicensed spectrum, data transmission.

The transmitter 82 is configured to send the idle time to a first access device, where the idle time is used to indicate a time segment in which the first access device performs data transmission by using the unlicensed spectrum.

For a method used by the processor 81 to acquire the time segment that is reserved for the second access device to perform, by using the unlicensed spectrum, data transmission, and the idle time, reference may be made to the method embodiments.

Optionally, the idle time is a timeslot or a subframe, in which the second access device does not perform data transmission, in the time segment that is reserved for the second access device to perform, by using the unlicensed spectrum, data transmission.

Optionally, the transmitter 82 is further configured to send second indication information to the first access device, where the second indication information is used to indicate the time segment that is reserved for the second access device to perform, by using the unlicensed spectrum, data transmission.

On the basis of the foregoing implementation manner, the transmitter 82 is further configured to send third indication information to the first access device, where the third indication information is used to indicate a radio access technology used by the second access device, so that the first access device performs, by using the radio access technology, data transmission in the unlicensed spectrum and the idle time.

By means of application of the technical solution provided in the embodiment shown in FIG. 7 or FIG. 8, in a same unlicensed spectrum, and in the idle time, in which data transmission is not performed, in the time segment that is reserved for the second access device to perform data transmission, the first access device performs data transmission by using the unlicensed spectrum, so that the unlicensed spectrum in the idle time can be fully utilized and a waste of resources is reduced.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided, it should be understood that the disclosed system, apparatus, and method may be implemented in other manners. For example, the described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) or a processor to perform a part of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

Finally, it should be noted that the foregoing embodiments are merely intended for describing the technical solutions of the present invention but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A first access device, comprising a processor, a receiver, and a transmitter connected to the receiver by a bus;
    wherein the receiver is configured to receive first indication information from a second access device, wherein the first indication information indicates an idle time in which the second access device does not perform data transmission, the idle time being comprised in a time segment that is reserved for the second access device to perform data transmission using an unlicensed spectrum, and wherein the first access device and the second access device are network-side devices that are configured to connect user equipment to one or more networks; and
    the processor is configured to control the transmitter or the receiver to perform data transmission in the idle time using the unlicensed spectrum.

2. The first access device according to claim 1, wherein the idle time is a timeslot or a subframe in which the second access device does not perform data transmission in the time segment that is reserved for the second access device to perform data transmission using the unlicensed spectrum.

3. The first access device according to claim 1, wherein the receiver is further configured to receive second indication information sent from the second access device before the receiver receives the first indication information, wherein the second indication information indicates the time segment that is reserved for the second access device to perform data transmission using the unlicensed spectrum; and
    wherein the processor is configured to control the transmitter or the receiver to stop data transmission in the time segment that is reserved for the second access device to perform data transmission using the unlicensed spectrum.

4. The first access device according to claim 1, wherein the receiver is further configured to receive third indication information, wherein the third indication information indicates a radio access technology used by the second access device; and
    wherein the processor is configured to control the transmitter or the receiver to perform, according to the radio access technology used by the second access device, data transmission in the unlicensed spectrum and the idle time.

5. The first access device according to claim 4, wherein the processor is further configured to determine whether the first access device supports the radio access technology used by the second access device; and
    the processor is configured to control the transmitter or the receiver to perform, using the radio access technology used by the second access device, data transmission in the unlicensed spectrum and the idle time in response to the processor determining that the first access device supports the radio access technology used by the second access device.

6. The first access device according to claim 4, wherein the processor is further configured to determine whether the first access device supports the radio access technology used by the second access device;
    the processor is further configured to convert the idle time into time corresponding to a radio access technology supported by the first access device in response to the processor determining the first access device does not support the radio access technology used by the second access device, and control the transmitter or the receiver to perform, using a radio access technology supported by the first access device, data transmission in the unlicensed spectrum and the time corresponding to the radio access technology supported by the first access device.

7. A second access device, comprising a processor and a transmitter coupled to the processor by a bus;
    wherein the processor is configured to acquire an idle time in which the second access device does not perform data transmission, the idle time being comprised in a time segment that is reserved for the second access device to perform data transmission using an unlicensed spectrum; and a transmitter, configured to send the idle time to a first access device, wherein the idle time is used as a time segment in which the first access device performs data transmission using the unlicensed spectrum;

wherein the first access device and the second access device are network-side devices that are configured to connect user equipment to one or more networks.

8. The second access device according to claim 7, wherein the idle time is a timeslot or a subframe in which the second access device does not perform data transmission in the time segment that is reserved for the second access device to perform data transmission using the unlicensed spectrum.

9. The second access device according to claim 7, wherein the transmitter is further configured to send second indication information to the first access device, wherein the second indication information indicates the time segment that is reserved for the second access device to perform data transmission using the unlicensed spectrum.

10. The second access device according to claim 7, wherein the transmitter is further configured to send third indication information to the first access device, wherein the third indication information indicates a radio access technology used by the second access device, and the radio access technology is used for the first access device to perform, according to the radio access technology, data transmission in the unlicensed spectrum and the idle time.

11. A method for using an unlicensed spectrum, comprising:

receiving, by a first access device, first indication information sent by a second access device, wherein the first indication information indicates an idle time in which the second access device does not perform data transmission, in a time segment that is reserved for the second access device to perform data transmission using an unlicensed spectrum; and performing, by the first access device, data transmission in the idle time using the unlicensed spectrum, wherein the first access device and the second access device are network-side devices that are configured to connect user equipment to one or more networks.

12. The method according to claim 11, wherein the idle time is a timeslot or a subframe in which the second access device does not perform data transmission in the time segment that is reserved for the second access device to perform data transmission using the unlicensed spectrum.

13. The method according to claim 11, wherein before receiving, by a first access device, first indication information sent by a second access device, the method further comprises:

receiving, by the first access device, second indication information sent by the second access device, wherein the second indication information indicates the time segment that is reserved for the second access device to perform data transmission using the unlicensed spectrum; and stopping, by the first access device, data transmission in the time segment that is reserved for the second access device to perform data transmission using the unlicensed spectrum.

14. The method according to claim 11, wherein the method further comprises:

receiving, by the first access device, third indication information sent by the second access device, wherein the third indication information indicates a radio access technology used by the second access device; and wherein the performing, by the first access device, data transmission in the idle time using the unlicensed spectrum comprises:

performing, by the first access device according to the radio access technology used by the second access device, data transmission in the unlicensed spectrum and the idle time.

15. The method according to claim 14, wherein performing, by the first access device according to the radio access technology used by the second access device, data transmission in the unlicensed spectrum and the idle time comprises:

determining, by the first access device, whether the first access device supports the radio access technology used by the second access device; and performing, by the first access device using the radio access technology used by the second access device, data transmission in the unlicensed spectrum and the idle time in response to the first access device determining that the first access device supports the radio access technology used by the second access device.

16. The method according to claim 14, wherein performing, by the first access device according to the radio access technology used by the second access device, data transmission in the unlicensed spectrum and the idle time comprises:

converting, by the first access device, the idle time into time corresponding to a radio access technology supported by the first access device in response to the first access device determining the first access device does not support the radio access technology used by the second access device; and performing, by the first access device using the radio access technology supported by the first access device, data transmission in the unlicensed spectrum and the time corresponding to the radio access technology supported by the first access device.

\* \* \* \* \*